Figure 3:
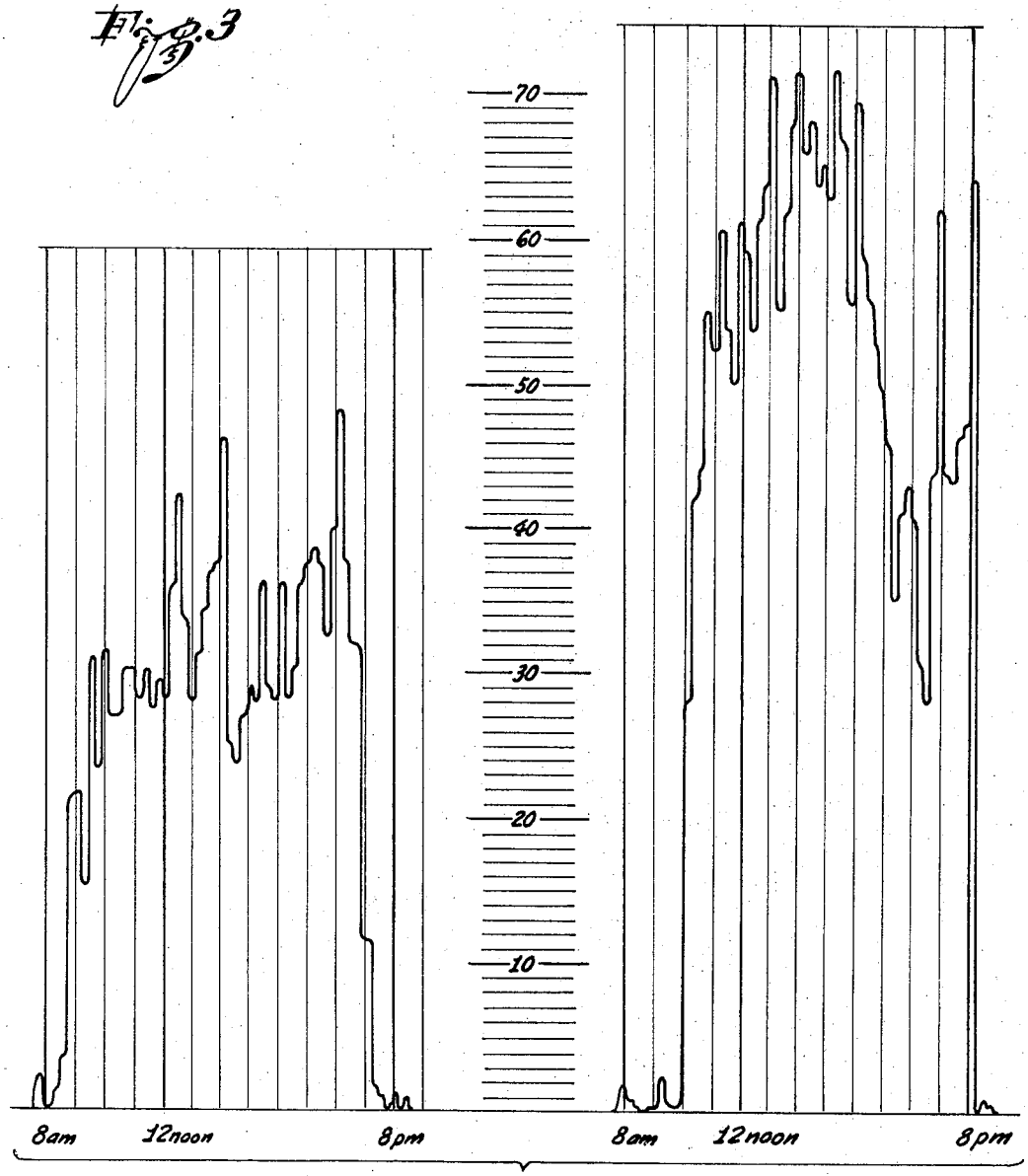

United States Patent [19]
Schlesinger

[11] 3,808,410
[45] Apr. 30, 1974

[54] METHOD FOR PROVIDING REPRESENTATION FOR NEEDED WORK FORCE IN A STORE

[76] Inventor: Robert J. Schlesinger, 5108 Melvin Ave., Tarzana, Calif. 91356

[22] Filed: June 19, 1972

[21] Appl. No.: 264,163

[52] U.S. Cl. .................................. 235/156, 235/152
[51] Int. Cl. ............................................ G06f 15/20
[58] Field of Search ................. 235/156, 152; 444/1

[56] References Cited
OTHER PUBLICATIONS
S. Shapiro, "IBM Systems Journal," Vol. 4, No. 1, 1965, pgs. 53–57
Jackson, "Management Science," Vol. 10, No. 1, Oct. 1963, pgs. 131–142

*Primary Examiner*—Malcolm A. Morrison
*Assistant Examiner*—James F. Gottman
*Attorney, Agent, or Firm*—Ralf H. Siegemund

[57] ABSTRACT

Method of providing representation for needed work force in a store by determining the arrival rate of customers at a store; determining the rate of customers actually checking out, determining the average duration for customer check out; and providing a representation of number of clerks needed on basis of the determinations made under the previous steps and further on basis of an arbitrarily selected average waiting period per customer.

3 Claims, 3 Drawing Figures

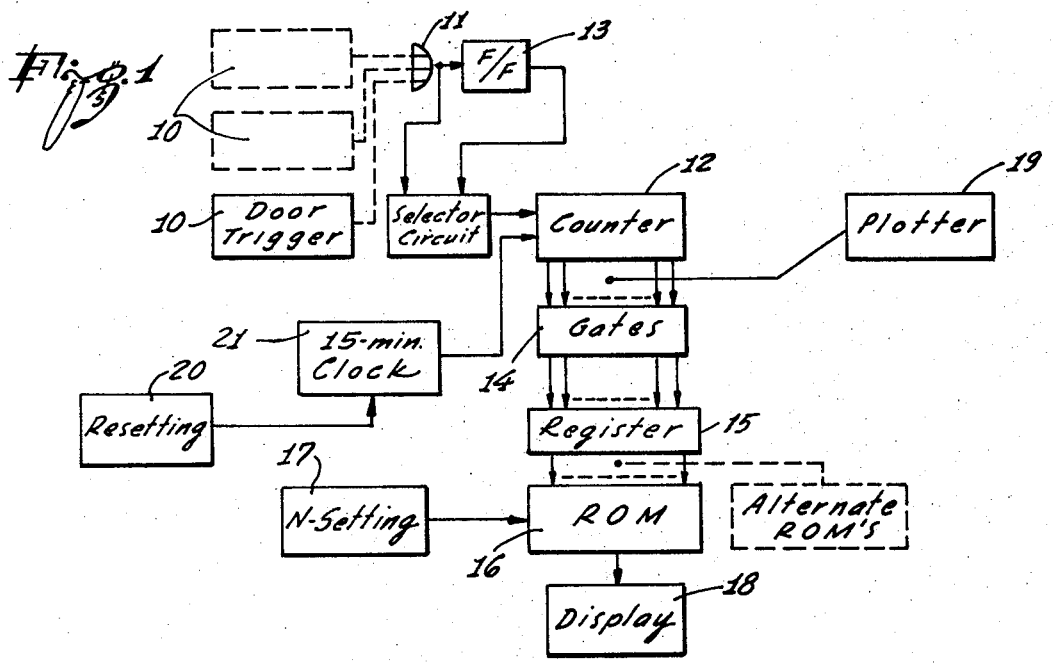

METHOD FOR PROVIDING REPRESENTATION FOR NEEDED WORK FORCE IN A STORE

The present invention relates to a method and system for providing an indication and representation of needed work force for customer check out in a store.

It is an object of the present invention to provide for a method and system according to which a store manager can schedule his work force for opening additional check-out facilities well ahead of time, and not after he happens to observe that people queue up suddenly on one or a few check-out counters. Conversely, it is also of interest to the manager to know when less than the "normal" number of open counters are needed. Fluctuations in the demand for service and check out occur quite unexpectedly during a day. Why this is so may be of interest to the sociologist. However, an efficient store manager wants to avoid that customers or, better, potential customers will leave the store only because they expect to have to wait too long for service. A store that becomes known for slow check out will usually lose customers. Therefore, it is necessary and good business sense to make sure that customers will not have to wait too long before being served. Just having the maximum number of check-out counters open a all times is inefficient and may not be profitable on that account.

Thus, the number of available check-out facilities when needed should be determined on basis of the actual demand. In accordance with the preferred embodiment of the invention, it is suggested to determine the arrival rate of customers in the store, to determine proportionally the number of actual check-outs made, to determine the average duration for customer check-out, to determine the average period a customer spends in the store actually shopping before entering a check-out line, to select a waiting period deemed tolerable on the average for any customer, and to correlate these numbers to determine the number of check-out facilities needed afer about as many minutes have elapsed equal to the said average period of shopping. The several average periods and numbers are determined initially through tallying, time period metering, etc. The arrival rate is ascertained on a running basis, and through appropriate implementation the additional or lesser number of clerks and check-out facilities needed is ascertained to be effective after about this average shopping period has elapsed.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a block diagram of a system for practicing the preferred embodiment of the invention; and FIGS. 2 and 3 are examples of relevant charts, with the added possibility that FIG. 2 can be used as an overlay on charts of type shown in FIG. 3.

Proceeding now to the detailed description of the drawings, FIG. 1 shows one or more input elements 10 for the depicted system which can be designated "door triggers." These input elements and door triggers are, for example, light barriers or pressure sensitive switches disposed at or near the entrance doors of a store. These input elements are triggered whenever a person passes through such a door. If the store has separate entrance and exit doors, these door triggers 10 are disposed at the entrance door or doors only. These input elements 10 each provide a signal for each person entering the store through the respective door. All these signals from the several doors (if there are several doors) are fed possibly via an OR gate 11 to a counter 12 which is, for example, a binary counter.

In case the same door or doors serve for both entering and leaving the store, the number of persons entered is half the number of accumulated count signals. This half number can be derived, for example, from binary counter 12 by outputing its count state corresponding to a right shift of the binary number contained therein. Such right shift is the equivalent of a division of the counter number by two. Alternatively, a flip-flop 13 may be interposed to suppress every other signal, and a selector circuit feeds with each pulse on the output pulses from flip-flop 13 to the input of counter 12.

The rather simple way of gaining the number of persons that actually entered the store through halving the accumulated number of passages through the doors is based on the assumption that everybody entering this store will also leave it. This, however, is reasonably true only on the average, and for the entire day; it is not true for each 15-minute period. For example, upon opening the store, all passages through the doors during the first fifteen minutes must be attributed to entering. During early store hours, entering will still dominate, while towards closing time there will occur a gradual shift to predominantly leaving of the store while close to store closing, hardly anybody will enter. Therefore, halving the number of passages does not produce the correct number of persons entering during these particular periods. However, that this falsification of data is not material and may be balanced inherently will be shown below.

The system includes a clock 21 which may be a regular clock or digital clock provided with circuitry to give off a signal, say once every 15 minutes. This clock determines the time base T for statistical processes carried out by the equipment to be described below. The clock signal resets counter 12. The duration of T as a time base period is not critical, but should be netiher too short, nor too long. As stated, the purpose of the clock is to provide a time base for deriving a rate value for door passages through a counting process. The content of counter 12, after every 15 minutes of counting and as repeated in fifteen-minute intervals throughout the day, gives the rate of people entering the store. Too short a time base is undesirable, as it causes needless introduction of fluctuations in the rate value which are meaningless as the entire system's operation is based on statistical time averaging. On the other hand, too long a period of time base is undesirable, as it introduces an undesired period before the system recognizes that the customer rate has, for example, increased or decreased. Half an hour or longer may be too long, a few minutes may be too short. However, the larger the store with many doors, the shorter time base is permissible, as the total number of people, say in time span of a few minutes, may already be quite high and may fluctuate very little. Also, the longer the time base as extracted from clock 21, the larger must be the counter. It was found that an eight-bit counter amply suffices in most cases, as such counter will count up to 255 persons. The time base should accordingly be selected to be short enough that never more than 255 persons enter within that period.

The clock signal may have particular duration to serve as an enabling signal for a set of gates 14 which when enabled copy the content of counter 12 into a register 15. Counter 12 may actually be reset on the falling edge of the clock signal. Register 15 then holds the counting results as was accumulated over the previous 15-minute period.

As stated above, the number accumulated in counter 12 represents the true influx of people into the store during any 15-minute period only if there are separate entrance doors; otherwise toggle flip-flop 13 may specifically couple gate 11 to counter 12 so as to suppress every other signal which is the equivalent of a division by two, as all passages through all doors have been counted. The division-by-two yields the true influx for the normal case only and on the average. During the first 15 minutes, for example, after store opening, and possibly even during the first half hour or thereabouts, the selector may cause pulses from gate 11 to be set directly into counter 12 as people passing through doors during that period will only enter.

Of course, in case the entrance doors are monitored specifically, no such division-by-two is necessary, nor is there a special early morning situation in which the dvision-by-two will yield an incorrect result. In case only entrance doors are monitored, the accumulated counting is always related only to the number of people entering the store.

The content of register 15 serves as address for a read/only memory 16 or ROM, for short, which can also be termed an associative memory. Each location so addressed holds a particular number representing a parameter K. This number K is determined as follows:

$\lambda$ is the number that is in register 15 which is the rate of people arriving at the store; $\lambda$ is determined by the number of people counted (counter 12) per counting peiod T (e.g., 15 minutes). A parameter R represents the fraction of persons actually making purchases. Not everybody entering the store will actually be a purchaser, or demand a separate check-out. A couple, a family, etc., entering is counted as so many people entering the store, but as a group they may just make one purchase or require only one check-out for all the items they have selected for purchase. On the other hand, one person may make more than one purchase at different check-out facilities. Layout of the store and its check-out facilities will determine here whether or not any customer purchasing more than one item may actually enter different queue lines for check-out. Check-out facilities are often centralized so that multiple check outs at different times for the same customer or group of customers do not occur.

Of course, some people will leave the store without making a purchase. This may be for different reasons; one of them being that they expect to have to wait too long for check-out. One purpose of this invention is to inhibit a customer from leaving the store without making a purchase just because the check-out lines are too long.

The fraction R has to be determined empirically by tallying the number of persons entering the store cumulatively, for example, during the day, and counting the number of check outs actually made during that same time. The ratio of the latter to the former gives fraction R. It must be expected that this fraction R is not the same on different days of the week. For example, it was found empirically that some stores show an R from 0.37 to 0.4 on weekends, but from 0.45 to 0.5 on weekdays. Also, a higher ratio of people entering the store may actually make purchases during certain periods of the day (e.g., in the evening). The fraction R will also vary from store to store. "Window Shopping" is more prevalent in some stores than others. Also, some stores are more likely than others to experience "family" shopping.

A third parameter to be considered is the check-out or service rate. This is the number of persons actually passing through a check-out facility per unit time and being checked out. This parameter $\mu$ is determined by the average time it takes to check out a customer. For example, in a drug store the average check-out time was found to be about 1-¼ minutes. In discount department stores it is somewhat longer; about 1-½ minutes. If we choose a unit time of 15 minutes, the parameter $\mu$ is respectively 8 and 10 in these cases. Again, the parameter may be determined empirically.

R and $\mu$ are "store parameters" that have to be ascertained beforehand. Another parameter is arbitrarily selectable. It is the duration customers are deemed to find tolerable or find acceptable to wait. One can readily see a relationship to the service rate $\mu$. Waiting time tolerated by a customer before being serviced is not an absolute time span, but involves psychological factors. Expected waiting time is made "visible" to the customer by the number of persons waiting in line, i.e., by the average queue line length per check-out facility.

T is the time base which was assumed to be about fifteen minutes; W is the average waiting time of a customer in the queue line before being serviced, and the number N is the number of waiting customers per queue. A 5-minute waiting period W is about the equivalent of about 3 to 4 persons per queue. Depending to some extent on the type of store, longer lines are rarely tolerable before the store is regarded as being too slow for check out.

Upon combining the parameters above, the following two equations are true:

$$NK = \frac{\lambda R \mu (\lambda R/\mu)^K}{(K-1)!\,(K\mu - \lambda R)^2} \cdot \frac{1}{\left[\sum_{n=0}^{K-1} \frac{1}{n!}\left(\frac{\lambda R}{\mu}\right)^n\right] + \frac{1}{K!}\left(\frac{\lambda R}{\mu}\right)^K \frac{K\mu}{K\mu - \lambda R}}$$

$$W = \frac{\mu(\lambda R/\mu)^K}{(K-1)!\,(K\mu - \lambda R)^2} \cdot \frac{1}{\left[\sum_{m=\alpha}^{K-1} \frac{1}{n!}\left(\frac{\lambda R}{\mu}\right)^n\right] + \frac{1}{K!}\left(\frac{\lambda R}{\mu}\right)^K \frac{\mu K}{K\mu - R\lambda}}$$

These equations give one value for K, for each $\lambda$ which is the arrival rate of the customers and is variable as stated above, K is the number of check-out lines or number of customer-serving clerks, and depending upon utilization of N or W as parameter. It is clear that the equations have meaning only for integers of K. On the other hand, N, the number of people per waiting line, is a statistical average and does not have to be an integer. For example, a value for $N = 3.5$ means that about half the time there are three or four persons, respectively in one of the waiting lines; or that about half of the number of check-out lines has three people waiting, the other half has four customers waiting.

Strictly speaking, only one value for $\lambda$ is associated with one integer K by operation of the equation above. It will be recalled that the $\lambda$'s are the input addresses for the function table contained in ROM 16. But only integers for K are inputed and actually stored. Therefore, the ROM table will store only integers for K in several locations, whereby plural different $\lambda$'s as defining plural storage locations hold the same value for K. Alternatively, the ROM can be constructed so that plural values for $\lambda$ as ROM addresses when decoded lead to the same memory location therein.

The table has, of course, meaning only for one value of N or for one value of W, which are the tolerated number of waiting customers per check-out line and queue, and average waiting time. Also, only one value each of R and $\mu$ is operative in the system at any given time. The latter two parameters are, as stated above, store parameters but only $\mu$ can be expected to remain constant in time. Whether or not variations in R are minor and inconsequential must be determined empirically. However, it should be considered that $\lambda$ is the number of people entering the store in the chosen statistical period of time, e.g., 15 minutes. In the equations above, there appears always the term $\lambda R$. It will be recalled that $\lambda$ is determined by counting the number of people entering the store per period T (e.g., 15 minutes). Thus, the numerical values for $\lambda R$ in these equations are actually given by a number of people counted in counter 12 multiplied by the ratio R/T. Therefore, R in the term $\lambda R$ can be varied by inversely varying T. This is the function of the clock setting unit 20, which is manually set to vary the period as metered by clock 21 for indirectly varying the fraction R. Tolerable queue length and waiting time can also be considered a variable. People expect to wait a little longer on Saturday afternoon or during pre-holiday shopping. Therefore, the function table included in ROM 16 may have different $\lambda \rightarrow K$ association for different N's (or W's). As far as hardware is concerned, either different ROM's may be used, or additional inputs are needed amounting in effect to block-addressing of subsets of memory locations in the ROM. This, then, is the significance of the N-input (or W-input) section 17 for the ROM. The section 17 may have manual input for different settings and that in turn permits use of non-integral values for N as actually used in the function table.

A setting "one" here may stand for a "normal" of $N = 3$. A setting value "zero" may stand for example for $N = 1.5$; to be used in cases where customers are believed to have very little "waiting tolerance." A setting of "two" may stand for example for $N = 4.25$, to be used by the store manager when everybody expects to wait a little longer than usual, etc.

Each of these values enables a different portion of the ROM table for outputting K pursuant to the resulting modification in the equation above, respectively for $N = 1.5, 3, 4.25$ and possibly others. As far as implementation is concerned, the various parameters N may either select a different ROM or may change the decoding path for $\lambda$'s. The set of values K as integers of interest are, of course, the same throughout. If the ROM contains the function table on basis of average waiting time W, the unit 17 realizes analogously different waiting times as settings for interval ROM addressings.

In order to given an example, I refer to FIG. 3. A store may have found tolerable waiting time to be about 5 minutes per customer, which is the equivalent of $N = 3.3$. There is an almost linear relation between K and $R\lambda$. For up to about 20 arriving and buying customers (or groups) $K = 1$, i.e., only one clerk and one check-out line is needed for that situation. From between not quite 74 to not quite 100, four clerks are needed; from between 200 to about 225 customers, nine clerks are needed, etc.

A new number K as read from the ROM upon addressing it by a $\lambda$, is outputed once every 15 minutes, which is the time base interval T. The number is fed to display 18 and held therein for continuous display until updated. Updating occurs, of course, once every fifteen minutes or in whatever time interval has been selected as time base. The important aspect to be considered here is the fact that the number K as representing the number of clerks and operating check-out lines for maintaining a particular waiting line length, does not define such number as it is true right now, but at a later time. Again, depending on the type of store, there is a delay between the arrival of a customer at the store and his lining up for check out. Thus, $\lambda$ and K in the equation above are functions of time, but that time relation is subject to another parameter.

$\lambda = \lambda^*(t)$ with $t$ representing any given instant. K is also a function of time, but with a delay $\Delta t$; $K = K^*(t + \Delta t)$ wherein $\Delta t$ is the average time a customer spends in the store before lining up in a queue. Therefore, the equation above does not produce the currently valid K for a particular arrival rate of customers $\lambda$, but the resulting K has validity after a delay of $\Delta t$ in the future.

Parameter $\Delta t$ in the equation above, when written as far as its dependency on time is concerned, does not have to be considered explicitly and does not have to be included in the function table of the ROM; rather, the parameter $\Delta t$ enters into the interpretation of the display only. The number K displayed indicates the number of check-out lines needed in as many minutes as determined by $\Delta t$. That value, again, is a store parameter to be determined separately. Knowing this parameter, the store manager, when observing on panel 18 a change in the indicated number K, knows that in $\Delta t$ — minutes he will need so many more clerks if K has increased. Conversely, when K drops, he knows that soon he may close one check-out line and assign other work to that clerk.

It can now be seen why halving the total number of passages through all doors does not produce a significant error near closing time. The result displayed say about an hour before closing time shows number of clerks and lines needed relatively close to closing time. A later indication is no longer of interest to the store manager. Thus, even though the passages through doors during the last half-hour are practically all attributable to departing customers, the now indicated result is no longer of interest.

As preparation for setting up the system as described, the content of counter 12 whenever gated into register 15 is also applied to a plotter or a tape punch 19, or the like, for recording the arrival rate of prospective customers in fixed intervals. The resulting strip chart may appear as shown in FIG. 3. The Figure shows several quite unexpected arrival peaks, more or less at random times. Now, a parallel system equivalent to 10-11-12, but running on the same clock 21 is attached to the several counters tallying in fifteen-minute intervals the total number of check outs made. The resulting numbers V, as function of time, determine the total number of customers checked out within each time base period, which is the check-out rate for all counters. The time intergral of V taken over the entire period the store is open, for example during the day, gives the number of actual customers served. The time integral of $\lambda$ which can be ascertained concurrently, is the total number of people entering the store. The ratio of these two integrals can be used to determine the store parameter R. Stating it differently, the store parameter R is determined in tallying the total number of customers entering and the total number of individual check outs, and the ratio is the parameter R.

It can be seen that upon plotting $\lambda = \lambda^*(t)$ (FIG. 3) as well as $V = V^*(t)$, there is a time lag or average phase shift, and that phase shift is the period $\Delta t$. It is thus the average time a customer spends shopping in the store. The period $\Delta t$ is thus determined in preparation for the use of that system. In the alternative, $\Delta t$ can be determined by a representative example method determining, for example, from a number of customers the actual time they have spent in the store and averaging the resulting values. Also, it should be observed that $\Delta t$ will not be constant. During some days, for instance the pre-holiday shopping season, the period $\Delta t$ may be longer. Again, this fact is known to the store manager. Thus, upon display of a value K, or more particularly, upon observing the change in the display of K, the store manager learns that in that $\Delta t$ minutes hence, he will need one or more clerks more, or one or more clerks less for check out. Monitoring these changes will enable the store manager to efficiently schedule his work force.

When we talk about a display, this may refer to numerical digital display board with nixie tubes, or the like. Alternatively, there may be a running strip chart on which the outputs of K are posted. Thus, the plotter 19, for example, may be used as the display device 18 because when the system operates, charting of the customer arrivals is no longer needed. The store manager may not necessarily monitor the display all the time, but upon reading the chart he can see when a change occurs or has occurred, and that gives him the beginning of the $\Delta t$ period. The display may be used in a simplified version of the system; namely, directly on register 15. Rather than using an ROM control display for a number needed of clerks, the store manager may have a chart, such as shown in FIG. 2, correlating the arrival rate of customers as now directly displayed with the number of clerks and check-out lines needed in $\Delta t$ minutes.

Still alternatively, after shop charts on the average arrival rate of the type of FIG. 3 have been prepared for any length of time, it may be observed that this arrival rate follows very closely a particular pattern that repeats, say, from week-to-week. In that case, running acquisition of customer arrival rate may not be needed, as on basis of the plot of FIG. 3 used as an overlay, the number of clerks needed can be plotted, e.g., for each quarter hour, and used as a fixed plan for work force scheduling. Used in that manner is the purpose of the horizontal axis in FIG. 3. It can also be seen that cumulative data gained from these charts permits scheduling of work force on a weekly or monthly, etc. basis.

The invention is not limited to the embodiments described above but all changes and modifications thereof not constituting departures from the spirit and scope of the invention are intended to be included.

I claim:

1. A system for providing representation for needed work force in a store, comprising:
   first means for counting the number of customers arriving at the store in fixed, successive intervals to obtain a digital representation of customer arrival rate;
   second means including ROM in which are stored numbers representing the number of clerks needed for each arrival rate on basis of an average duration of customer checkout and on basis of an arbitrarily selected average waiting period per customer;
   third means connected to the first means and responsive to the number counted at the end of each interval for providing table look up in the second means at the end of each said intervals for obtaining a signal in representation of the number of clerks needed for the arrival rate as determined at the end of the intervals; and
   means responsive to the signal, providing display of said number of clerks.

2. A system as in claim 1, and including means for selecting different portions of the table in the second means for use by the third means in dependence upon the time of day.

3. A system as in claim 1 and including means for selecting different portions of the table in the second means for use by third means on basis of different waiting periods per customer.

* * * * *